(12) United States Patent
Riis et al.

(10) Patent No.: US 6,565,269 B2
(45) Date of Patent: May 20, 2003

(54) SYSTEMS AND METHODS FOR LOW-LOSS SPLICING OF OPTICAL FIBERS HAVING A HIGH CONCENTRATION OF FLUORINE TO OTHER TYPES OF OPTICAL FIBER

(75) Inventors: Lars Riis, Broenshoej (DK); Tonny Sorensen, Smoerum (DK); Torben Erik Veng, Broendby (DK)

(73) Assignee: Fitel USA Corp., Norcross, GA (US)

(*) Notice: Subject to any disclaimer, the term of this patent is extended or adjusted under 35 U.S.C. 154(b) by 122 days.

(21) Appl. No.: 09/778,444

(22) Filed: Feb. 7, 2001

(65) Prior Publication Data

US 2002/0159723 A1 Oct. 31, 2002

(51) Int. Cl.[7] .............................................. G02B 6/255
(52) U.S. Cl. .............................. 385/95; 385/96; 385/97
(58) Field of Search ..................... 385/95–99, 123–126; 156/64, 158

(56) References Cited

U.S. PATENT DOCUMENTS

| | | | |
|---|---|---|---|
| 4,102,717 A | * | 7/1978 | Hensel ......................... 156/64 |
| 4,326,870 A | | 4/1982 | Bendit et al. |
| 4,958,905 A | | 9/1990 | Tynes et al. |
| 5,963,698 A | * | 10/1999 | Brugger et al. ................ 385/95 |
| 6,244,757 B1 | | 6/2001 | Kim et al. |
| 6,428,218 B1 | * | 8/2002 | Mussig ......................... 385/96 |

FOREIGN PATENT DOCUMENTS

| | | |
|---|---|---|
| EP | 0890853 A1 | 1/1999 |
| EP | 1094946 A1 | 4/2001 |
| JP | 57078512 | 5/1982 |
| JP | 59152412 | 8/1984 |

* cited by examiner

Primary Examiner—Phan T. H. Palmer
(74) Attorney, Agent, or Firm—Priest & Goldstein, PLLC

(57) ABSTRACT

Techniques and systems are described for splicing together first and second optical fibers. A thermal treatment station is described, having a chassis, a fiber holding block for holding a pair of optical fibers that have been spliced together at a splice point, the fiber holding block including a cutaway portion exposing the splice point, and a torch, the fiber holding block and the torch being mounted to the chassis such that the positions of the splice point and the torch can be adjusted with respect to each other so that the splice point lies in the flame. A technique for splicing together two optical fibers is further described, in which the optical fibers are first spliced together using a fusion splicer and then thermally treated by positioning the splice point in a flame while monitoring splice loss.

22 Claims, 14 Drawing Sheets

FIG. 13

SPLICE LOSS @ 1550 nm FOR DCF SPLICED TO SSMF

| TRIAL NO: | TIME (min): | INTIAL LOSS IN FLAME (dB): | FINAL LOSS (dB): |
|---|---|---|---|
| #1 | 18 | 1.37 | 0.12 |
| #2 | 19 | 1.22 | 0.13 |
| #3 | 18 | 0.92 | 0.10 |
| #4 | 16 | 1.77 | 0.14 |
| #5 | 19 | 1.61 | 0.14 |
| #6 | 16 | 1.66 | 0.11 |
| #7 | 17 | 1.57 | 0.12 |
| #8 | 19 | 1.09 | 0.14 |
| #9 | 18 | 1.71 | 0.14 |

FIG. 14

SPLICE LOSS @ 1550 nm AND BREAK LOADS OF SPLICES AFTER HEAT-TREATMENT

| TRIAL NO: | FINAL LOSS (dB): | BREAK LOAD (kpsi): |
|---|---|---|
| #1 | 0.11 | 283 |
| #2 | 0.13 | 265 |
| #3 | 0.11 | 313 |

SYSTEMS AND METHODS FOR LOW-LOSS SPLICING OF OPTICAL FIBERS HAVING A HIGH CONCENTRATION OF FLUORINE TO OTHER TYPES OF OPTICAL FIBER

BACKGROUND OF THE INVENTION

1. Field of the Invention

The present invention relates generally to improvements to techniques used to splice optical fiber, and more particularly to advantageous aspects of systems and methods for low-loss splicing of optical fibers having a high concentration of fluorine to other types of optical fiber.

2. Description of the Prior Art

A new class of optical fibers has recently been developed known as dispersion-compensating fiber (DCF), which has a steeply sloped, negative dispersion characteristic. One use for DCF is to optimize the dispersion characteristics of already existing optical fiber links fabricated from standard single-mode fibers (SSMF) for operation at a different wavelength. This technique is disclosed in U.S. patent application Ser. No. 09/596,454, filed on Jun. 19, 2000, assigned to the assignee of the present application, the drawings and disclosure of which are hereby incorporated by reference in their entirety.

An important parameter for DCF is the excess loss that results when DCF is spliced to SSMF. To obtain a highly negative dispersion, DCF uses a small core with a high refractive index, having a mode-field diameter of approximately 5.0 μm at 1550 nm, compared with the approximately 10.5 μm mode-field diameter of SSMF at 1550 nm. The difference in core diameters results in significant signal loss when a fusion splicing technique is used to connect DCF to SSMF. It is possible to reduce the amount of signal loss by choosing splicing parameters that allow the core of the DCF to diffuse, thereby causing the mode-field diameter of the DCF core to taper outwards, resulting in a funneling effect. However, the high concentration of fluorine dopant in typical DCFs limits the application of this technique, because the amount and duration of the heat required to produce the funneling effect may result in an undesirable diffusion of the fluorine dopant.

There is thus a need for improved techniques for splicing DCF to SSMF that reduces splice loss below current limits.

SUMMARY OF THE INVENTION

The above-described issues and others are addressed by the present invention, aspects of which provide methods and systems for splicing together first and second optical fibers. One aspect of the invention provides a thermal treatment station, comprising a chassis, a fiber holding block for holding a pair of optical fibers that have been spliced together at a splice point, the fiber holding block including a cutaway portion exposing the splice point, and a torch. The fiber holding block and the torch are preferably mounted to the chassis such that the positions of the splice point and the torch can be adjusted with respect to each other so that the splice point lies in the flame. A further aspect of the invention provides a method for splicing together two optical fibers in which the optical fibers are first spliced together using a fusion splicer and then thermally treated by positioning the splice point in a flame while monitoring splice loss.

Additional features and advantages of the present invention will become apparent by reference to the following detailed description and accompanying drawings.

BRIEF DESCRIPTION OF THE DRAWINGS

FIG. 13 shows a table setting forth splice loss results obtained using the thermal treatment station illustrated in FIG. 5.

FIG. 14 shows a table setting forth splice loss and break loads for high-strength splices treated using the thermal treatment station illustrated in FIG. 5.

DETAILED DESCRIPTION

One aspect of the present invention provides a technique for splicing fibers with a relatively high concentration of fluorine to other types of optical fiber. A suitable use for this technique is to reduce splice loss when a dispersion compensating fiber (DCF) is spliced to other types of optical fibers having a larger spotsize than the DCF, such as a standard single mode fiber (SSMF). According to one aspect of this technique, mode-field expansion of the DCF using electrical arc heating is combined with thermal-induced diffusion of the DCF dopants using a flame, furnace or other suitable heating source. This thermal-induced diffusion of optical dopants is also known as the "thermally-diffused expanded core" (TEC) technique.

Figure 1A:
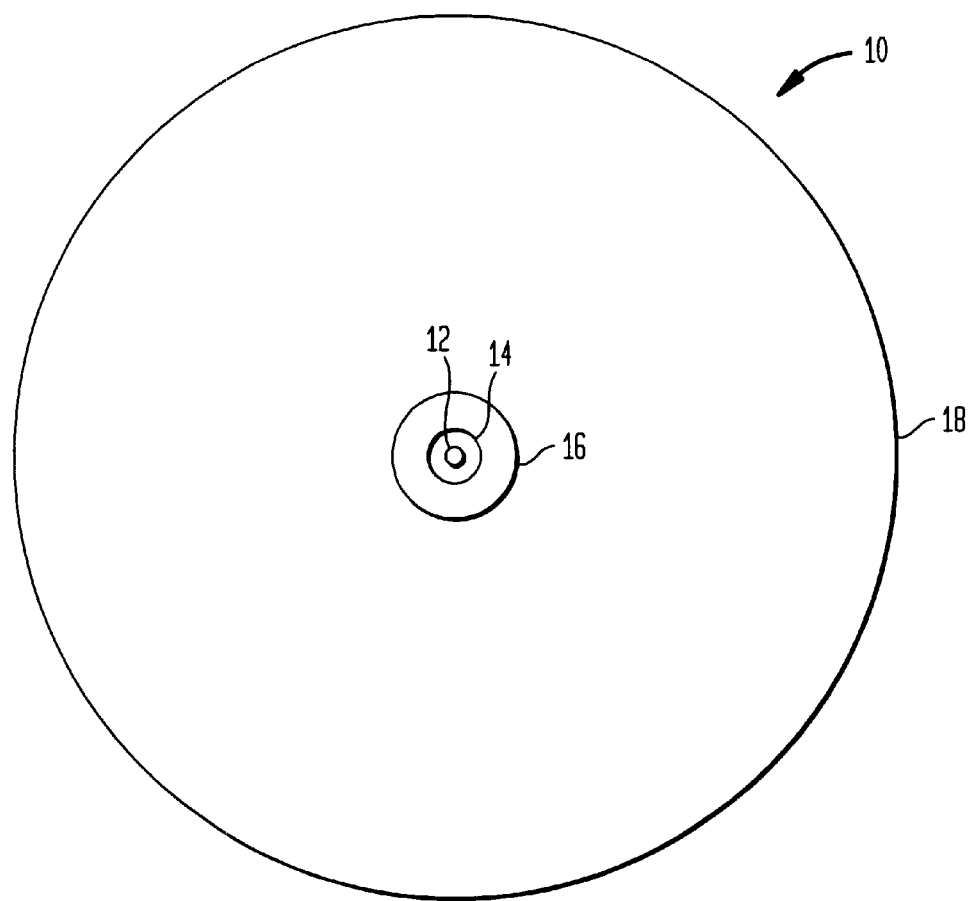
FIG. 1A shows a cross section of a typical dispersion compensating fiber.
Figure 1B:
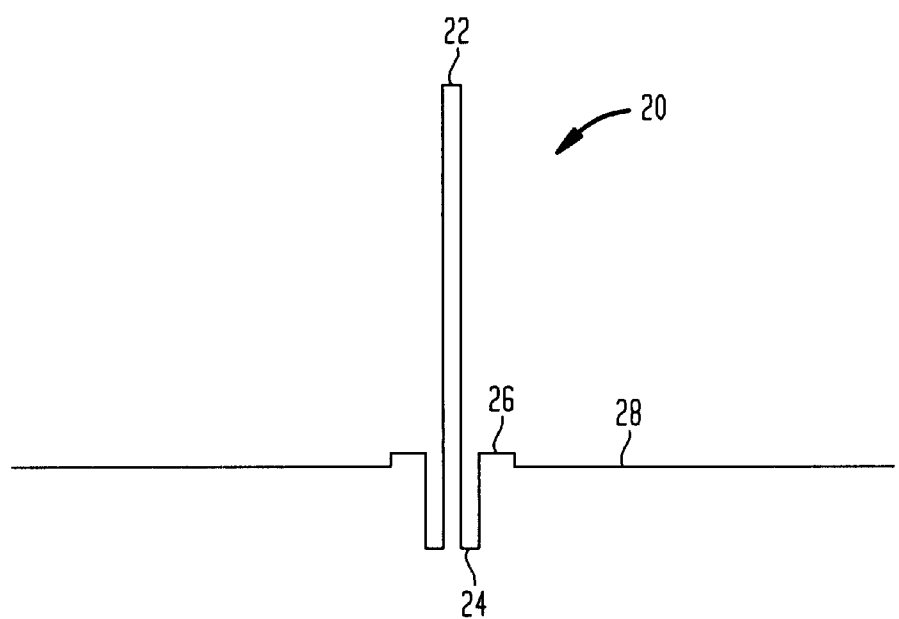
FIG. 1B shows a refractive index profile of the dispersion compensating fiber shown in FIG. 1A.

In general, DCF is difficult to splice because of its refractive index (RI) profile. FIG. 1A shows a cross section of a sample of a typical DCF 10, and FIG. 11B shows the refractive index (RI) profile 20 corresponding to the DCF 10 shown in FIG. 1A. As shown in FIG. 1A, the DCF includes a core 12 surrounded by cladding that includes first, second, and third cladding regions 14, 16, and 18. As shown in FIG. 1B, the RI profile includes a central spike 22 corresponding to the DCF core 10, a trench 24 on either side of the spike 22 corresponding to the first cladding region 14, a ridge 26 on either side of each trench 24 corresponding to the second cladding region 16, and a flat section 28 on either side of each ridge 26 corresponding to the third cladding region 18.

DCF is typically fabricated from a silicon dioxide ($SiO_2$) based glass. The desired RI profile is achieved by doping the core 12 and cladding regions 14, 16, and 18, with suitable dopants. In one DCF design, the core 12 is doped with germanium (Ge), the first cladding region is doped with fluorine (F), the second cladding region is doped with germanium and fluorine (G/F), and the third cladding region is doped with fluorine (F) at a lower concentration than the first cladding region. Alternatively, in some DCF designs, the third cladding region is not doped.

To obtain a sufficiently deep trench 24 on either side of the core 22, the first cladding region 14 is doped with a relatively high concentration of fluorine dopant. Because fluorine starts to diffuse at a much lower temperature than the typical temperatures reached during fusion splicing, a significant amount of fluorine diffusion may occur during a typical fusion splicing operation. This diffusion results in a relatively high splice loss unless very short fusion times are used.

Certain optical transmission link designs require DCF to be spliced to another type of fiber, such as SSMF. In these designs, both the core 22 and depressed regions 24 in the DCF must commonly be altered to obtain a low-loss conversion of the DCF optical profile to a profile having a spotsize similar to the spotsize of the other fiber. Because fluorine and the core dopant, which is typically germanium, start to diffuse at different temperatures, it is possible to cause the diffusion of the core and the depressed region to occur in a two-step process. First, the DCF is spliced to the other fiber with a standard fusion splicing using a splice program that is optimized for making the right expansion of the germanium core. At the same time, fluorine, which diffuses at a lower temperature than germanium, is diffused significantly. Hence, at this point in the process, the splice loss is very high due to the diffusion of the fluorine dopant.

The splice is now heated using either a flame or a furnace. The temperature is tuned such that fluorine diffusion starts, but no significant germanium diffusion occurs, i.e., the core expansion of the DCF is maintained. At the same time, no significant change to the RI profile of the second fiber will occur as long as the second fiber is not as heavily doped with fluorine as the DCF. Due to the thermal treatment, the fluorine profile in the DCF is now made smooth, and the splice loss is reduced to a value below what can be obtained only using a fusion splicer.

The above steps are now explained in greater detail with respect to the splicing together of a length of DCF with a length of SSMF. The splice is made while loss is monitored and the heating arc is kept on until a target splice loss value is reached, at which point the arc is turned off. The target splice loss value as well as the splice program parameters, such as the arc current, are determined by optimization for the actual DCF and SSMF used. Details on the implementation of the method will depend on the actual splicer used.

For example, for an Ericsson FSU925, the following approach yields results with high repeatability: The DCF is spliced to the SSMF using a relatively short fusion time, e.g., 0.3 seconds. After this splice, a service mode is entered into in which the arc can be turned on and off manually. A low arc current is used, e.g., 11 mA, to ensure that the process is so slow that it is possible to observe the evaluation of splice loss manually. The arc is then turned off when the desired value is reached. Optimal splice loss after the splicing will typically be in the range of 3–6 dB.

Figure 2:
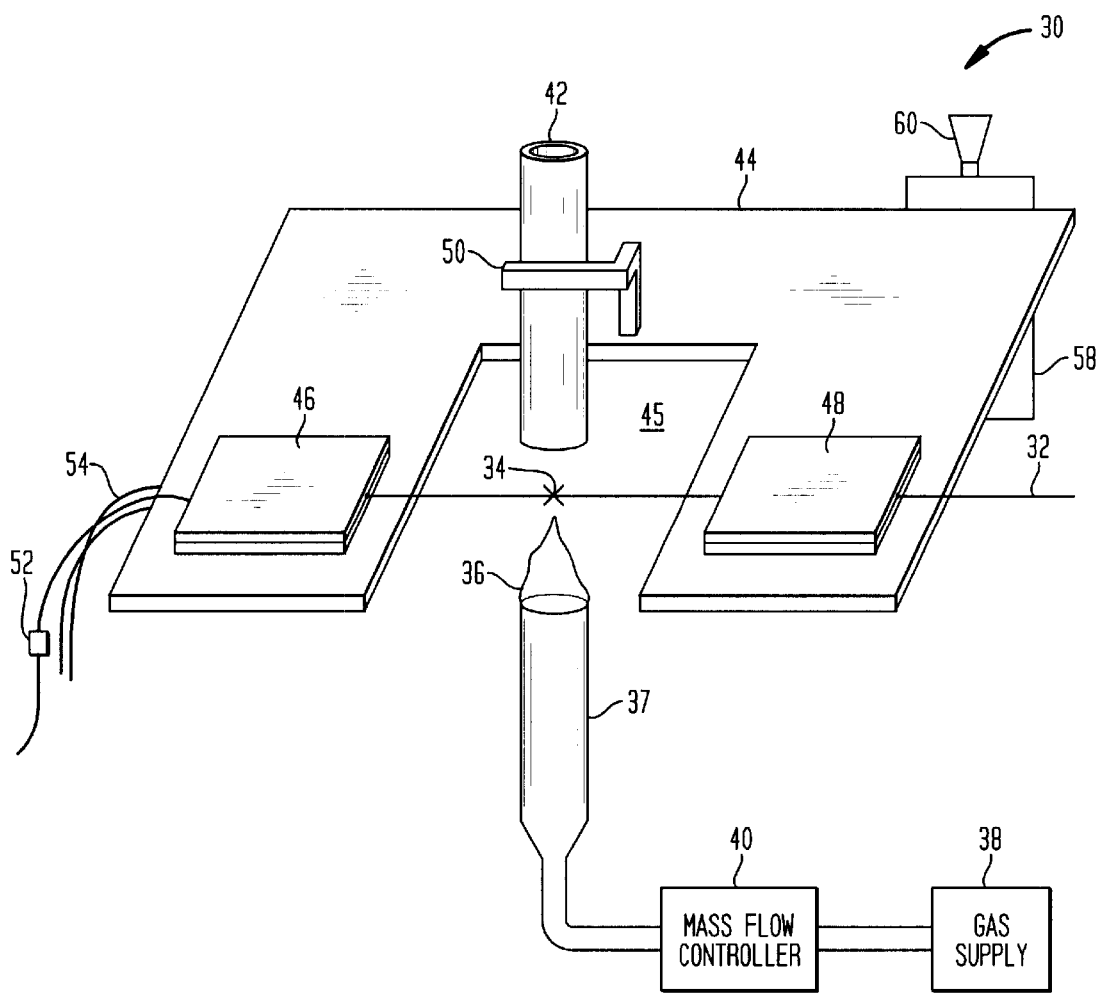
FIG. 2 shows a perspective view of a thermal treatment station according to an aspect of the present invention.

The splice is now ready for the thermal treatment. A furnace can be used or a torch, as described in the example below. FIG. 2 shows an embodiment of a thermal treatment station 30 according to a further aspect of the present invention, which is used to heat a spliced optical fiber 32. The splice point 34 of the optical fiber 32 is positioned over the flame 36 of a gas torch 37. In order to precisely regulate the torch 36, the torch's gas supply 38 is provided with a mass flow controller 40. A chimney 42 is located over the torch 36 to stabilize the flame during heating. The fiber 32 and chimney 42 are held in position by a plate 44 that includes a cutaway portion 45 for exposing the splice point 34. Specifically, the fiber 32 is held in position on the plate 44 by first and second clamps 46 and 48 located on either side of the cutaway portion 45, and the chimney 42 is held in position on the plate 44 by an arm 50 that grips the chimney 42.

A slight tension is maintained in the fiber 32 during the heating process by a weight that is removably attached to one end of the fiber. This tension prevents the fiber 32 from moving relative to the flame during the heating process. Care must be taken to decide the right weight to avoid stretching of the fiber when it is heated. In the present example, a weight of 0.7 g is used. The first clamp 46 holds the fiber 32 sufficiently loosely to allow the tension in the fiber to be controlled in this manner and functions more as a guide than a clamp. To prevent bending damage to the fiber, a curved guide is provided, upon which the weighted portion of the fiber rests during the heating process. As described further below, the plate 44 is movable relative to the torch 36 using a translation stage 58 upon which the plate 44 is mounted. A position reading device 60 is provided that provides precise information as to location of the plate 44.

When the spliced fiber 32 is mounted into the thermal treatment station 30, the plate 44 is positioned far above the flame. After mounting, the splice point 34 is moved into the flame using the translation stage 58. For repeatable results, the position of the translation stage 58 is monitored using the position reading device 60. Once an optimal position for the splice point 34 with respect to the flame 36 is determined, this position is used for subsequent thermal treatments.

In the present embodiment, the torch 37 is fabricated from a quartz tube having an inner diameter of approximately 4 mm. Since the temperature necessary to diffuse the fluorine is estimated to be approximately 1200–1300° C., a gas such as propane or hydrogen without an additional oxygen supply can be used. The mass flow controller 40 is used to keep the gas flow at the right value. Typical flows are about 10 ml/min (for propane). Again, this value must be optimized for the particular fibers used.

The splice loss is monitored while the splice 34 is in the flame 36. When the minimum splice loss is reached, in approximately 10 minutes, the translator 58 is used to remove the splice 34 from the flame 36. The splice 34 can now be removed from the thermal treatment station 30. The thermal treatment station design shown in FIG. 2 requires only 1 cm of bare fiber at the splice point 34. This is useful for compact splice protection.

Figure 3:
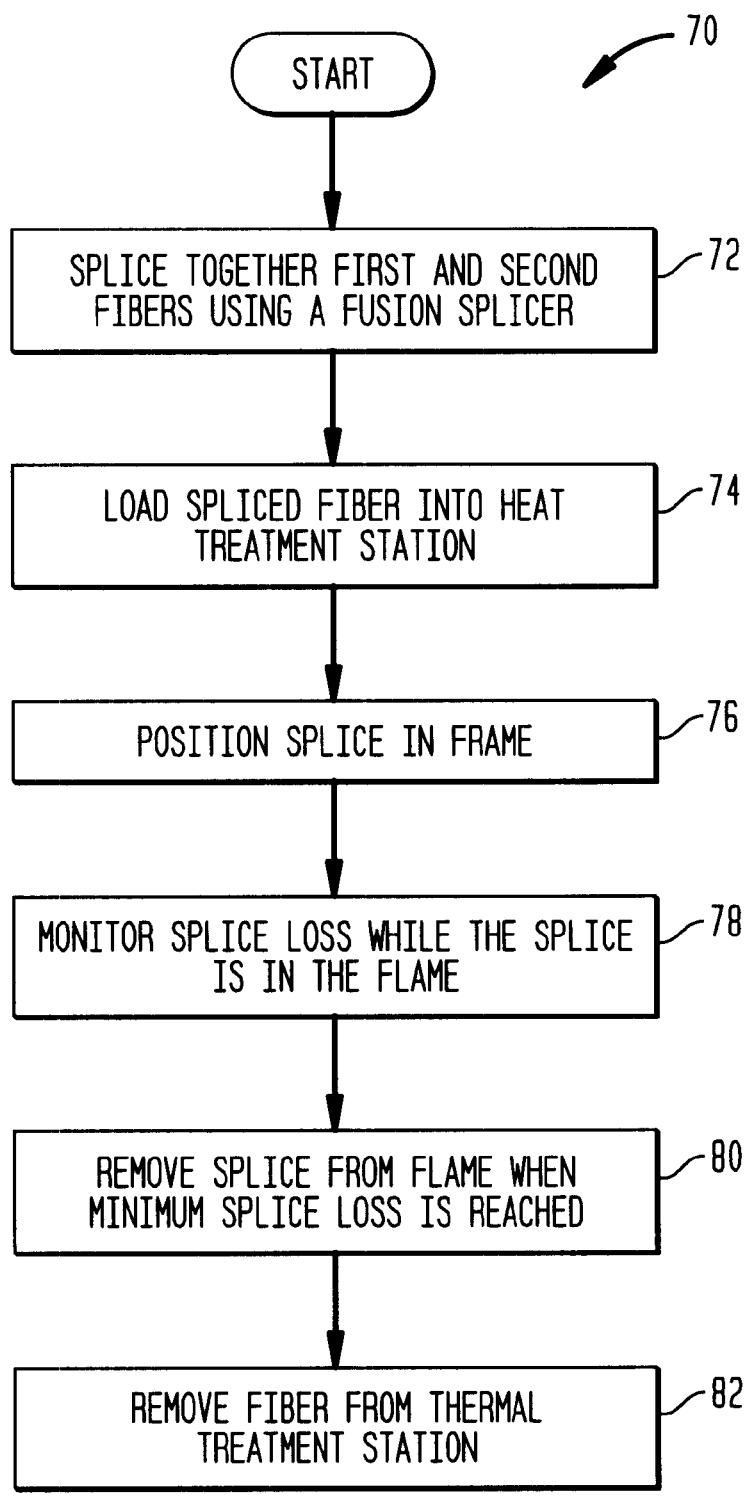
FIG. 3 shows a flowchart of a method according to a further aspect of the present invention.

FIG. 3 shows a flowchart illustrating a method 70 embodying the above-described technique. In step 72, the first and second fibers are spliced together using a fusion splicer. As described above, the fusion splicing parameters are chosen to achieve an optimal mode-field expansion of the core of the first fiber in order to reduce splice loss resulting from mismatch in core sizes of the first and second fibers. In step 74, the spliced fiber is loaded into a thermal treatment station, such as the station illustrated in FIG. 2. In step 76, the splice point is positioned in the flame. This can be accomplished either by moving the splice point, moving the torch, or moving both the splice point and the torch. In step 78, the splice loss is monitored while the splice is in the flame. In step 80, the splice is removed from the flame when a desired minimum splice loss is achieved. Finally, in step 82, the thermally treated fiber is removed from the thermal treatment station.

Figure 4:
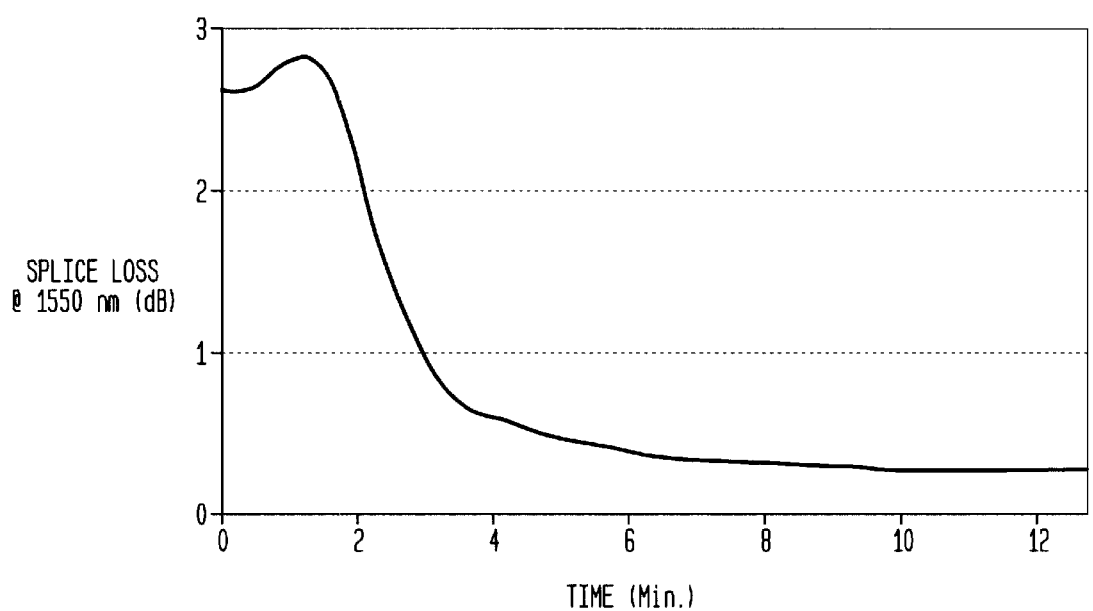
FIG. 4 shows a graph illustrating the relationship between thermal treatment time and splice loss.

FIG. 4 shows a graph 90 illustrating typical behavior of splice loss as a function of time of thermal treatment. For comparison, the lowest splice loss that can be obtained for the actual DCF design is approximately 0.8 dB, when only a fusion splicer is used. One feature of the present technique is that it can be performed in a relative short amount of time. Using the fusion splicer to splice together the two fibers and create the desired core expansion typically requires only a few minutes. Using thermal treatment to create the desired diffusion of the fluorine dopant typically requires only 10 minutes, approximately, for reaching a minimum splice loss value.

Figure 5:
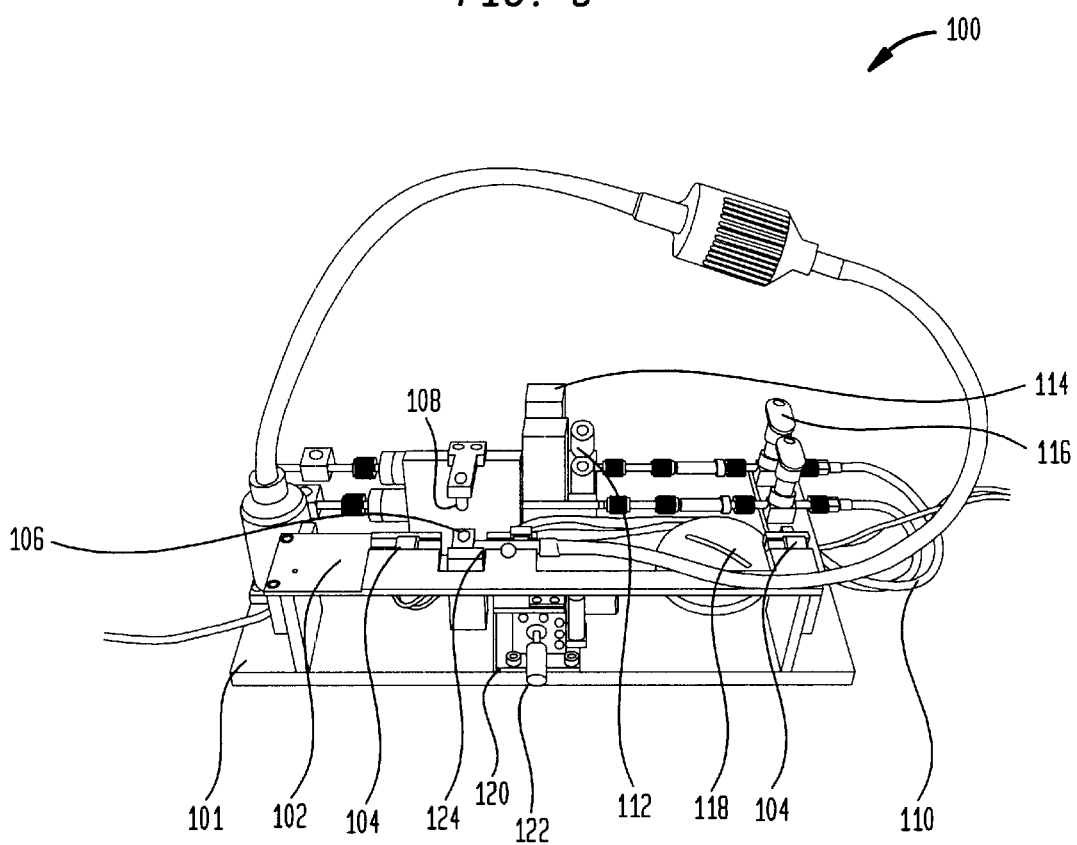
FIG. 5 shows a perspective view of a further embodiment of a thermal treatment station according to the present invention.

FIG. 5 shows a further embodiment of a thermal treatment station 100 for use in performing the TEC technique described above. As shown in FIG. 5, the thermal treatment station 100 includes, positioned on top of a chassis 101, a fiber holding block 102 having a series of clamps 104 for holding the optical fiber to be heat treated, a torch 106 for applying a flame to the fiber, and a chimney 108 for stabilizing the torch flame. The gas supply includes a pair of gas lines 110 for carrying, respectively, a flammable gas and oxygen. Gas flow through each line is regulated by a flow controller 112. In addition, each gas line includes a filter 114 and a valve 116, and both lines are fed through a gas alarm 118. As described in further detail below, the thermal treatment station 100 provides for translational movement, along the x-axis, y-axis, and z-axis, of the fiber held in the fiber holding block 102 relative to the torch 106. First, the fiber holding block 102 is mounted such that it may be manually pulled along the y-axis, that is, towards the operator of the station, and then pushed back into position. Second, a translation stage 120 provides for precise translational movement of the torch 106 along the x, y, and z axes. The precise position of the torch 106 can be monitored by three screws protruding 122 from the translation stage 120, each screw corresponding to an axis of translational movement. The station 100 is provided with a lamp 124 or other device to provide suitable illumination of the splice point. A further embodiment of the invention includes a laser or other suitable device mounted relative to the splice point, such that is can be used to assist in the alignment of the splice with respect to the flame.

Figure 6A:
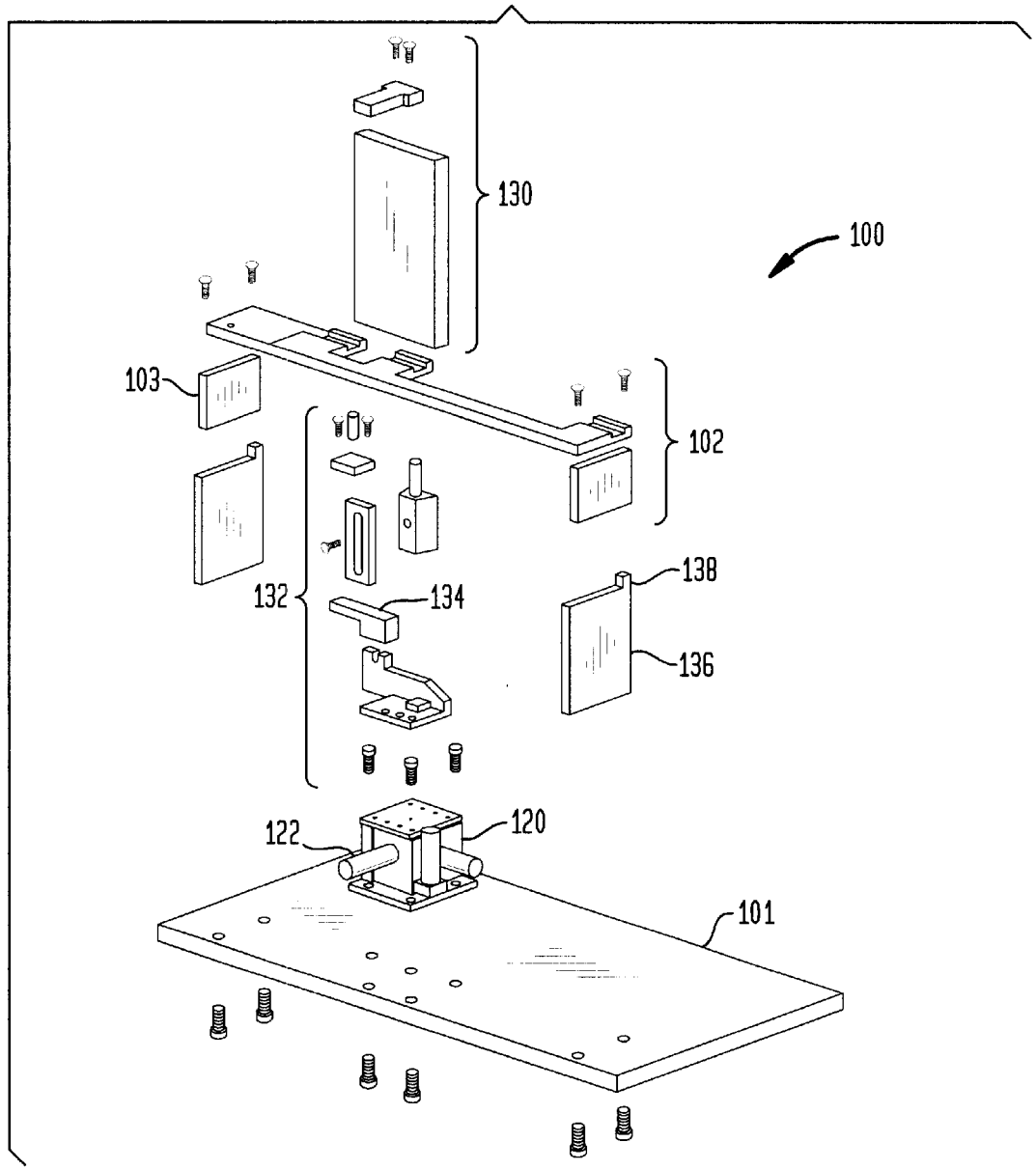
FIG. 6A shows an exploded perspective view.
Figure 6B:
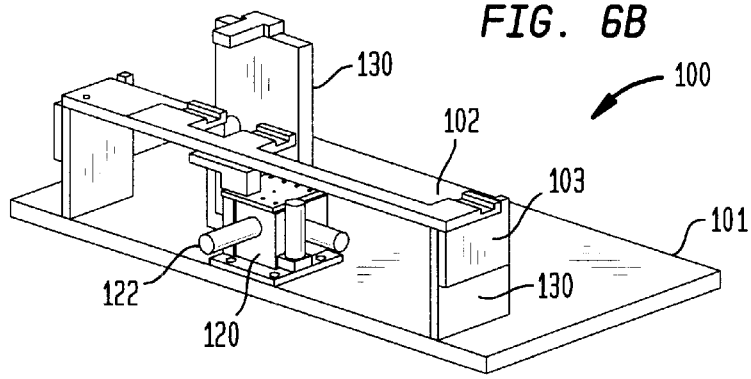
FIG. 6B shows an assembled perspective view, of the thermal treatment station shown in FIG. 5, with the gas supply lines removed for purposes of illustration.
Figure 10:
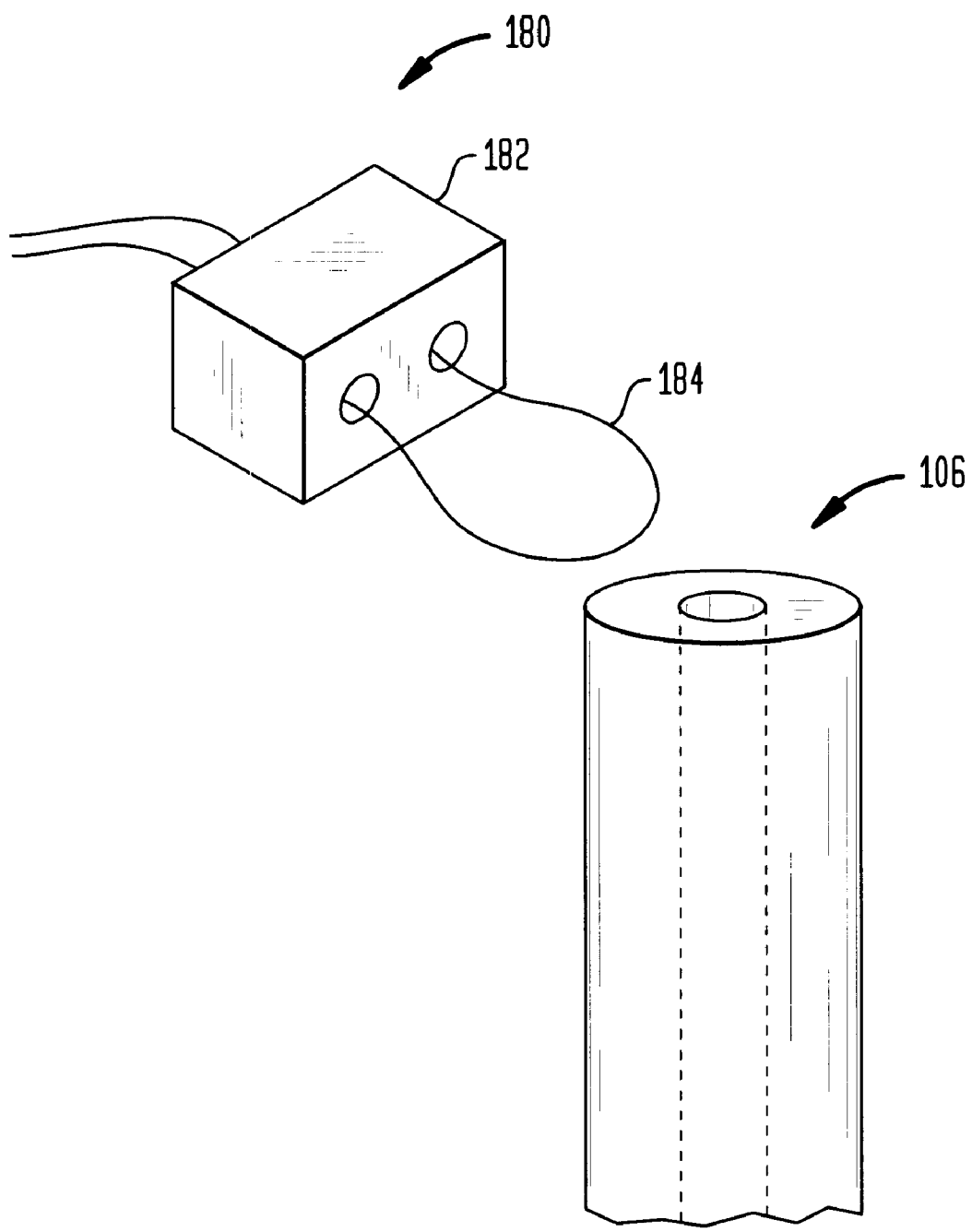
FIG. 10 shows a perspective view of a heating wire assembly positioned proximate to a torch head according to a further aspect of the invention.

FIG. 6A shows an exploded perspective view of the thermal treatment station 100 shown in FIG. 5, with the gas supply elements removed for purposes of illustration. FIG. 6B shows an assembled perspective view of the thermal treatment station 100. As shown in FIGS. 6A and 6B, the station 100 includes a chimney holder 130 for holding the chimney 108 in position over the flame, and a torch holder 132. In addition, as shown in FIG. 6A, the station 100 includes a small mounting block 134 that is used to hold a heating wire assembly that is used to insure that the torch flame has not been extinguished inadvertently. The heating wire assembly is illustrated in FIG. 10, described below. The chimney holder 130, torch holder 132, and mounting block 134 are all mounted to the translation stage 120 so that they move as a single unit with respect to the fiber holding block 102.

The chimney holder 130 insures that the chimney is located directly about the flame to stabilize it. When the chimney is properly positioned, a relatively short length of bare fiber is required to avoid the flame burning the fiber coating near the splice point. This is useful for situations in which the final product packaging requires very short splice protection.

FIG. 6A further shows the side supports 136, upon which the fiber holding block 102 rests. As mentioned above, the fiber holding block 102 is slidably disposed onto the top surfaces of the side supports 136 such that the fiber holding block may be moved by a station operator along the y-axis. It will be seen in FIGS. 6A and 6B that the fiber holding block 102 includes a pair of legs, which closely straddle the outer surfaces of the side supports 136. This arrangement prevents the fiber holding block 102 from being slid off-axis as it is moved back and forth by the station operator. It will further be seen in FIG. 6A that each side support 136 includes an upwardly protruding member 138 at the rear of its upper surface that functions as a backstop to establish a working position for the fiber block. Thus, in positioning the fiber holding block 102 over the torch, a station operator needs only to push the block 102 forwards until it abuts the pair of upwardly protruding members 138.

Figure 6C:
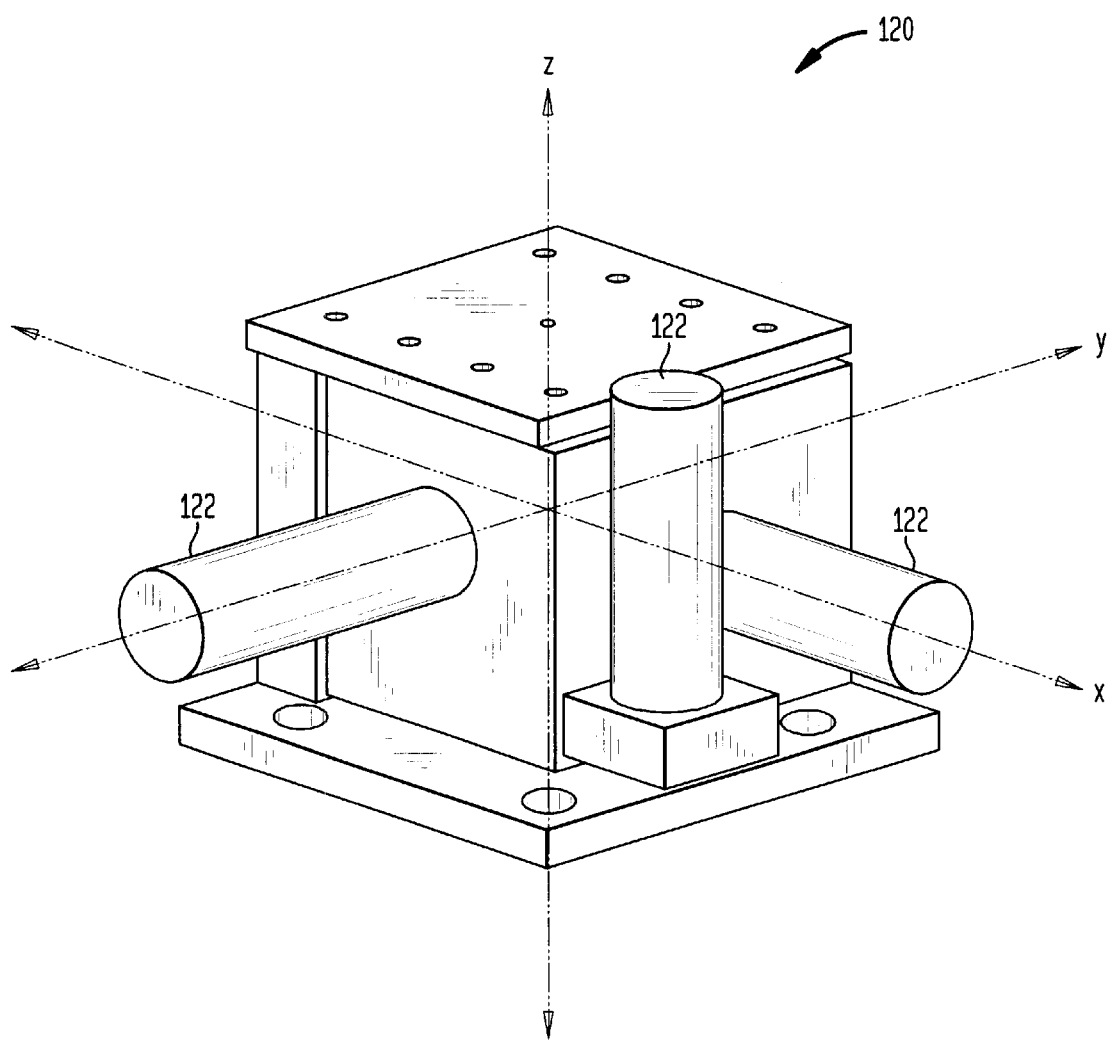
FIG. 6C shows a perspective view of a translation stage suitable for use in the thermal treatment station shown in FIG. 5.

FIG. 6C shows a perspective view of the translation stage 120 shown in FIGS. 5, 6A and 6B. FIG. 6C illustrates the three axes of movement controlled by turning the screws 122. Movement along the x-axis is side to side, movement along the y-axis is in and out, and movement along the z-axis is up and down.

Figure 7:
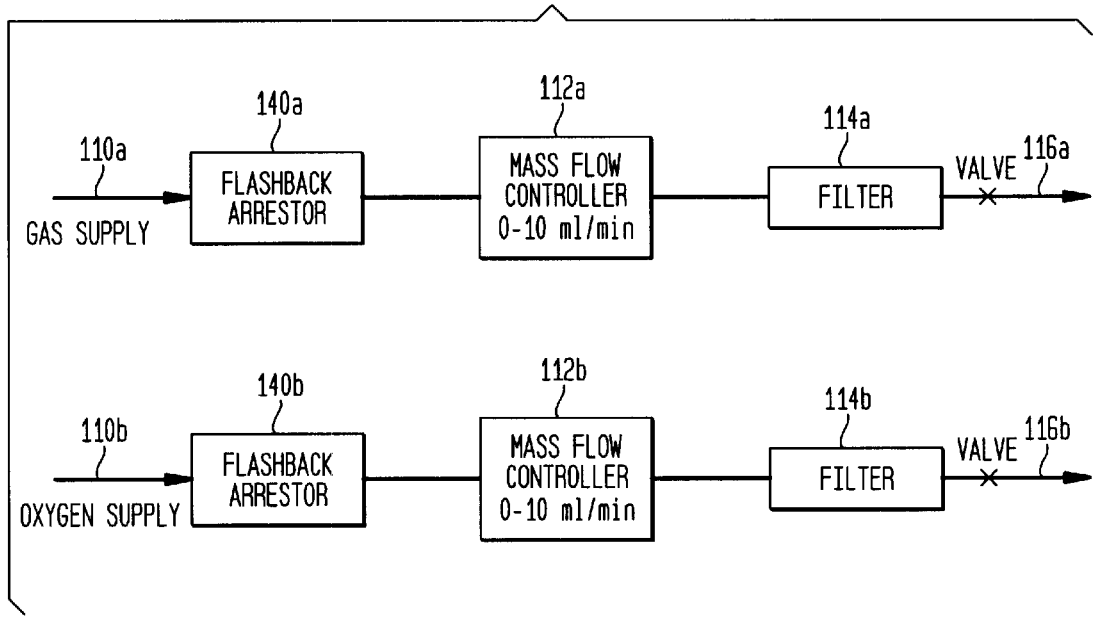
FIG. 7 shows a diagram of gas and oxygen supply lines suitable for use in the thermal treatment station shown in FIG. 5.

FIG. 7 shows a diagram of the components of the gas and oxygen supply lines shown in FIG. 5 as a single element 110. For the purposes of the present discussion, the two supply lines are now separately identified as a first supply line 110a that supplies a flammable gas or mixture of gases to the torch 106 and a second supply line 110b that supplies oxygen to the torch 106. As shown in FIG. 7, each supply line includes a flashback arrestor 140a and 140b, a mass flow controller 112a and 112b, a filter 114a and 114b, and a valve 116a and 116b. The mass flow controllers 112a and 112b are controlled separately, and precisely control the flow of gas or oxygen, respectively, at a delivery rate ranging from 0 to 20 milliliters per minute. The use of oxygen allows the temperature of the flame to be increased, as required.

Figure 8A:
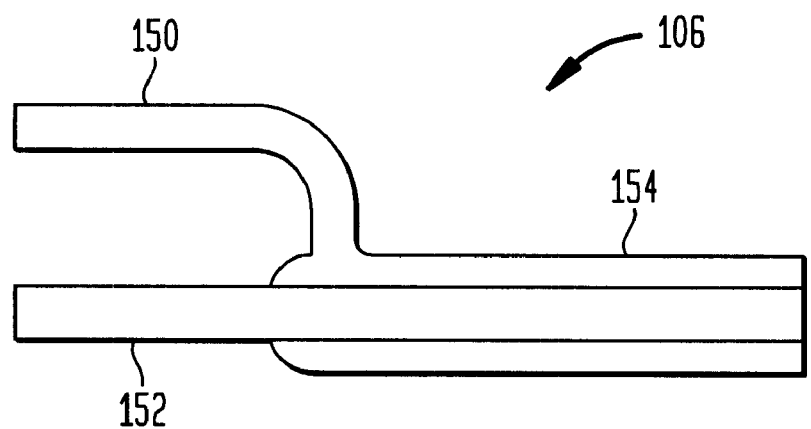
FIG. 8A shows a cross section.
Figure 8B:
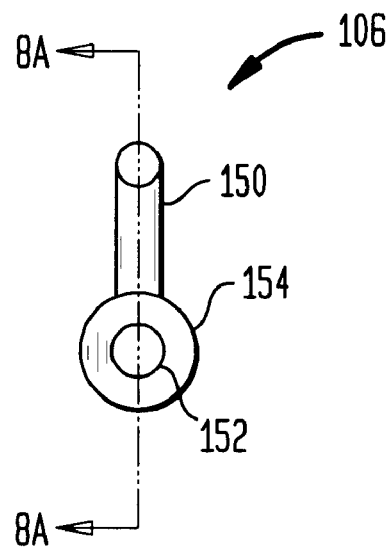
FIG. 8B shows a front elevation view, of a torch suitable for use in the thermal treatment station shown in FIG. 5.

FIG. 8A shows a cross section, and FIG. 8B shows a front elevation view, of a modified single jet torch 106 that may suitably be used in conjunction with the thermal treatment station 100 illustrated in FIG. 5. The torch 106 includes an upper conduit 150 that is connected to an oxygen supply, and a lower conduit 152 that is connected to a gas supply. The upper conduit 150 terminates in a jacket 154 that surrounds the terminal end of the lower conduit 152. Thus, as shown in FIG. 8B, the flame end of the torch 106 includes a center jet of gas supplied by the lower conduit 152 and a ring jet of oxygen surrounding the gas jet, the ring jet of oxygen supplied by the jacket 154. In the present embodiment of the torch 106, the length of the torch is 80 mm, the length of the jacket is 55 mm, and the center-to-center distance between the conduits is 20 mm. The conduits have an inner diameter of 4 mm and an outer diameter of 6 mm. The jacket has an inner diameter of 9 mm and an outer diameter of 11 mm.

Figure 9A:
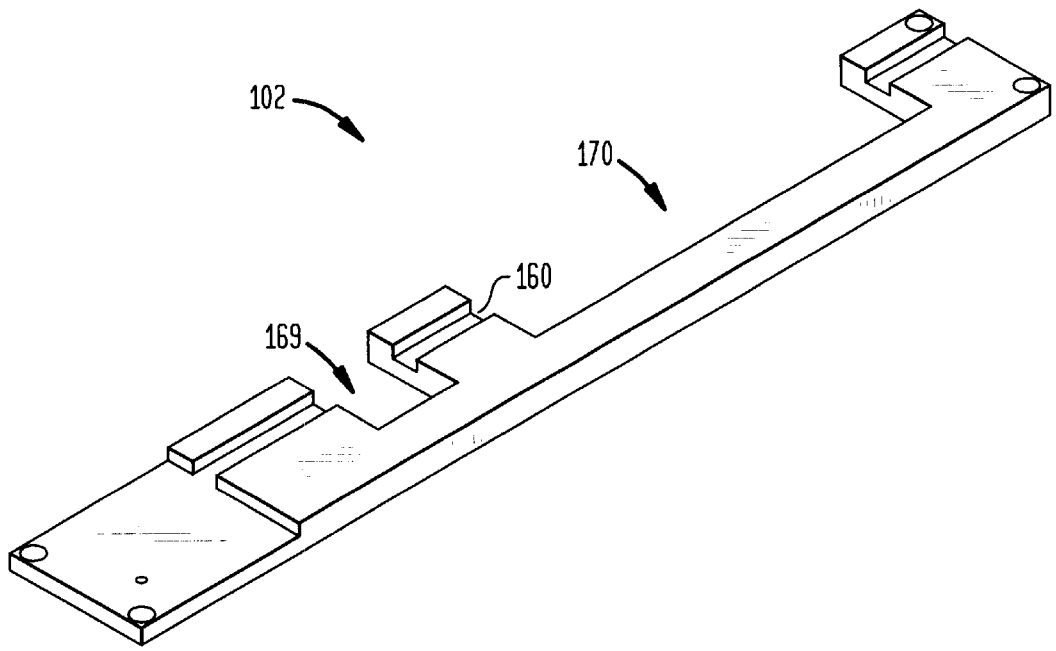
FIG. 9A shows a perspective view.
Figure 9B:
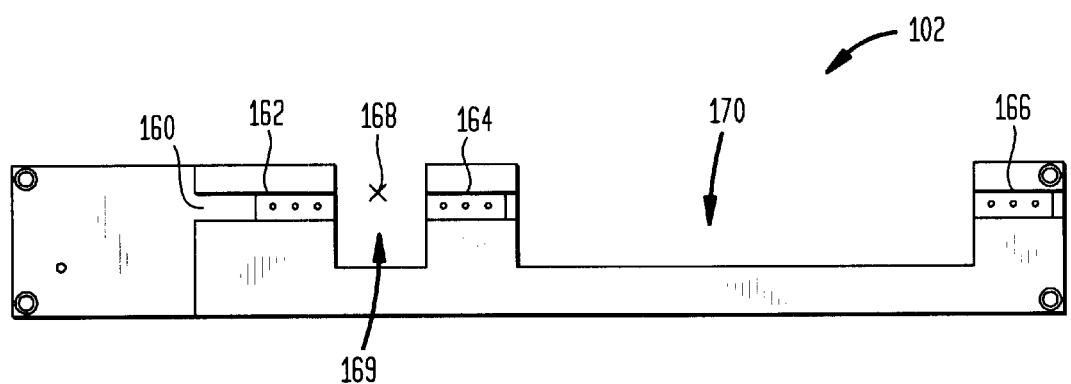
FIG. 9B shows a plan view, of the fiber holding block used in the thermal treatment station shown in FIG. 5.

FIG. 9A shows a perspective view and FIG. 9B shows a plan view of the fiber holding block 102, without the legs 103 shown in FIGS. 6A and 6B. The fiber holding block 102 includes a channel 160 for receiving the optical fiber to be treated. In addition, there are three clamps 162, 164, and 166 for holding the optical fiber in position. The first and third clamps 162 and 166 are of a type that hold the fiber in a fixed position. The second clamp 164 is of a type that acts as a guide but does not fix its position. The reason for this combination of clamps is to create the correct amount of tension in the fiber at the splice point 168 when the splice point is placed into the flame for thermal treatment. As shown in FIG. 9B, the first and second clamps 162 and 164 are positioned on either side of a first cutaway portion 169 that exposes the splice point 168.

Because the position of the fiber is not fixed with respect to the second clamp 164, the weight of the fiber itself in a "weight region" 170 is sufficient to create the correct amount of tension at the splice point 168. As shown in FIG. 9B, the weight region 170 is a second cutaway portion of a length that is sufficient such that a length of optical fiber overhanging this region 170 will have sufficient weight to produce the desired tension at the splice point 168. It has been found that a length of approximately 200 mm for the weight region 170 creates enough tension at the splice point to insure that the fibers do not bend due to the flame. However, at the same time, the tension is significantly low so that the heated fibers do not taper, or stretch.

FIG. 10 shows a perspective view of a heating wire assembly 180 that is used to insure that there is a flame at the torch 106. The heating wire assembly 180 includes a ceramic block 182 and a length of wire 184. In the present embodiment of the invention, the heating wire 184 is a platinum (Pt) wire having a diameter of approximately 0.3 mm. The wire is heated by applying a current to it. The heated wire turns on the flame when the thermal treatment station 100 is started and insures that the flame is on at all times when the device is running. The heating wire assembly 180 is useful because gas flows are often very small, and the flame can easily be extinguished inadvertently.

Figure 11A:
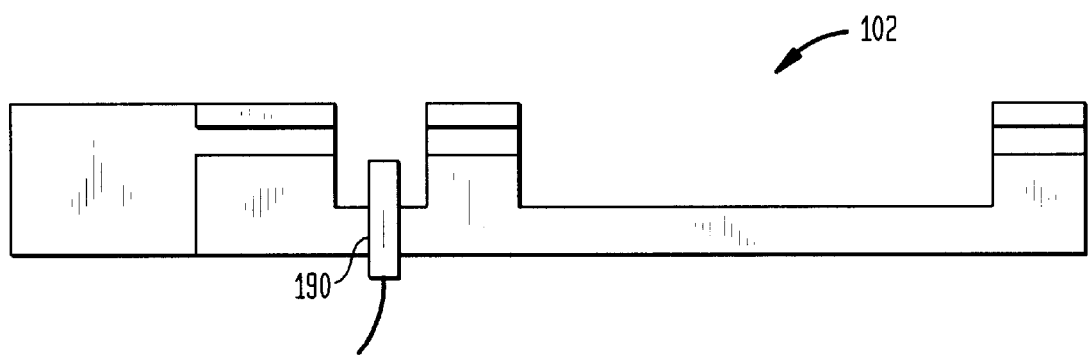
FIG. 11A shows a plan view of the fiber holding block shown in FIG. 9A with a visible laser source positioned proximate thereto in accordance with a further aspect of the invention.
Figure 11B:
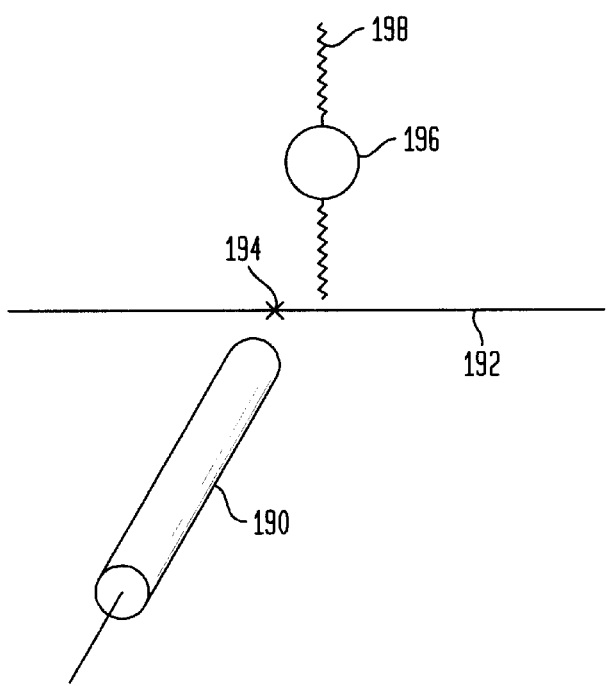
FIG. 11B shows a perspective view of the visible laser source shown in FIG. 11B, and the characteristic interference pattern that results when the visible laser beam is directed through an optical fiber splice point.

FIG. 11A is a plan view of the fiber holding block 102 proximate to which has been positioned a visible laser source 190. The laser 190 can be used to insure that the splice has been properly aligned in the fiber holding block 102 along the x-axis after the spliced fiber has been moved from a fusion splicer to the thermal treatment station 100. It is desirable for the splice to be located right at the center of the torch flame.

The visible laser source 190 is mounted to the fiber holding block 102. As illustrated in FIG. 11B, when the laser beam passes through the splice point 194 of a spliced optical fiber 192, the result is a characteristic linear interference pattern 198 appearing in conjunction with the laser beam spot 196. By referring to this linear interference pattern, the torch can be positioned with respect to the splice point by using the translation stage 120.

Figure 12:
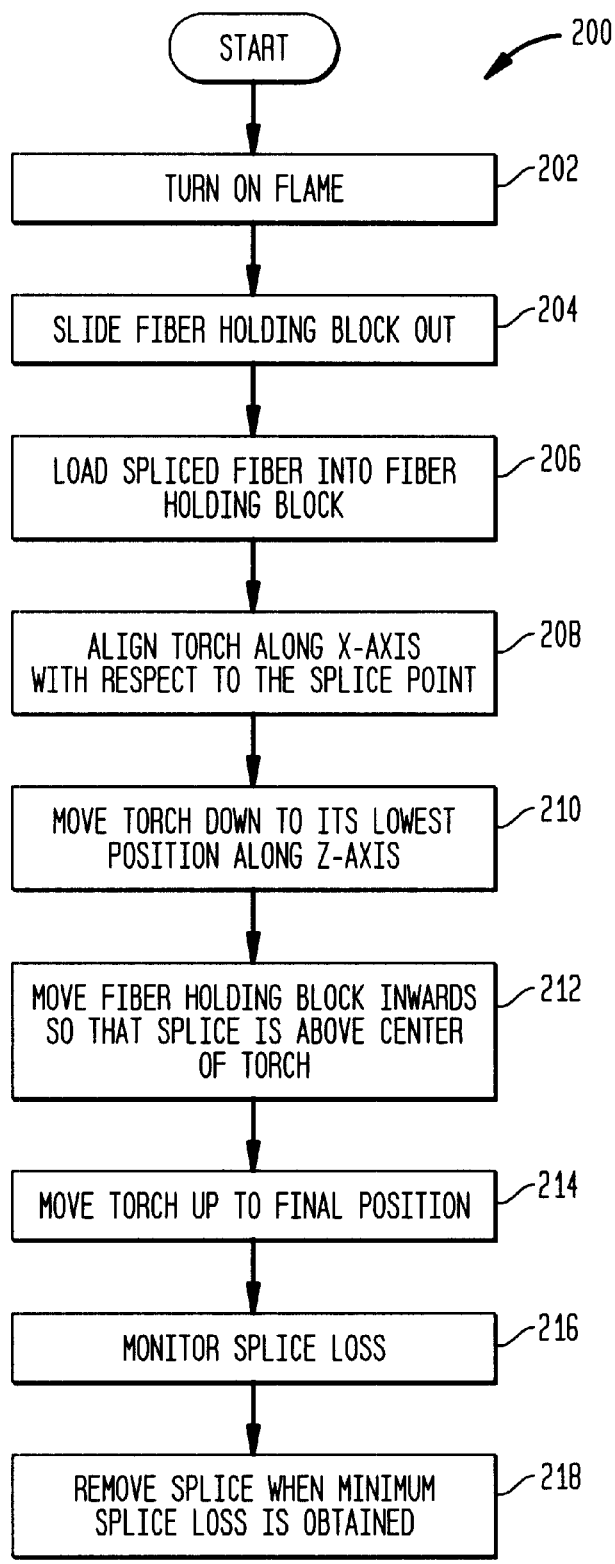
FIG. 12 shows a flowchart of a method according to a further aspect of the invention, employing the thermal treatment station illustrated in FIG. 5.

FIG. 12 shows a flowchart setting forth a method 200 for using the thermal treatment station illustrated in FIGS. 5 through 11. In step 202, the flame is turned on by opening the gas supply and by applying current to the heating wire. In step 204, the fiber holding block is pulled out slightly towards the station operator along the y-axis to insure that the splice is not in the flame when the splice is loaded into the fiber holding block. In step 206, a pair of fibers that has been spliced together using a fusion splicer is loaded into the fiber holding block. The position of the spliced fibers is fixed by closing the fiber holding clamps. In step 208, the torch is aligned along its x-axis such that the splice point is in the center of the flame. As described above, this can be accomplished by using a laser and observing the resulting interference pattern. In step 210, the torch is moved down to its lowest position along the z-axis. In step 212, the fiber holding block is moved inwards so that the splice is now right above the center of the torch. In step 214, the torch is moved up to its final position. The final position can be controlled by taking a position reading on the z-axis translation screw on the translation stage. In step 216, the splice loss is continually monitored during the thermal treatment process. In step 218, when the minimum splice loss is obtained, the splice is removed. The removal of the fiber is accomplished by first moving the torch down to its lowest position along its z-axis and then moving the fiber holding block along the y-axis away from the torch. The splice can now be removed by undoing the clamps.

FIG. 13 shows a table 220 setting forth typical loss values at 1550 nm resulting from applying the above described techniques to a length of DCF spliced to a length of SSMF. The DCF used for the splices was Standard Dispersion Compensating Fiber manufactured at Lucent Technologies Denmark I/S. The SSMF could, for example, be Corning SMF28 fiber. A combination of propane-butane and oxygen were used to obtain these splice losses. Also, it is possible to obtain splices of good strength when applying the above described techniques. FIG. 14 shows a table 230 setting forth splice data at 1550 nm having some of the best break loads obtained for splices made with a high-strength splicing setup and subsequently heat-treated according to the present invention. Again, a combination of propane-butane and oxygen were used.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A thermal treatment station, comprising:
   a chassis;
   a fiber holding block for holding a pair of optical fibers that have been spliced together at a splice point, the fiber holding block including a first cutaway portion exposing the splice point;
   a torch,
   the fiber holding block and the torch being mounted to the chassis such that the positions of the splice point and the torch can be adjusted with respect to each other so that the splice point lies in the flame.

2. The thermal treatment station of claim 1, wherein the fiber holding block includes a first clamp for holding the pair of spliced optical fibers in position.

3. The thermal treatment station of claim 2, wherein the fiber holding block includes a second clamp permitting movement of optical fiber therethrough, the second clamp functioning as a guide, the first and second clamps being positioned on the fiber holding block on either side of the cutaway portion.

4. The thermal treatment station of claim 3, wherein the fiber holding block includes a second cutaway region positioned such that the second clamp lies between the first cutaway region and the second cutaway region, the second cutaway region being of sufficient length such that when a pair of spliced optical fibers is loaded into the fiber holding block with a portion of optical fiber positioned over the second cutaway region, the portion of optical fiber over the second cutaway region has a weight sufficient to result in a desired level of tension at the splice point.

5. The thermal treatment station of claim 4, wherein the fiber holding block includes a third clamp positioned such that the second cutaway region lies between the second clamp and the third clamp, the third clamp holding optical fiber firmly in position.

6. The thermal treatment station of claim 1, further including first and second supply lines for supplying, respectively, gas and oxygen to the torch.

7. The thermal treatment station of claim 6, wherein the torch includes first and second supply conduits, the first supply conduits terminating in a jacket surrounding the second conduit.

8. The thermal treatment station of claim 7, wherein the first supply conduit is connected to the oxygen supply line and the second supply conduit is connected to the gas supply line.

9. The thermal treatment station of claim 6, wherein the first and second supply lines each include a mass flow controller for controlling the flow of gas or oxygen therethrough.

10. The thermal treatment station of claim 1, wherein the fiber holding block is mounted to the chassis such that the fiber holding block can be moved back and forth from a first position for loading the spliced fibers into the fiber holding block and a second position in which the splice point is position above the flame.

11. The thermal treatment station of claim 10, wherein the fiber holding block rests on the upper surfaces of a pair of side supports mounted to the chassis, the fiber holding block including a pair of legs that straddle the side supports such that the inner surfaces of the legs abut the outer surfaces of the side supports, such that the fiber holding block can be moved back and forth along a path defined by the side supports.

12. The thermal treatment station of claim 11, wherein the upper surface of each side support includes an upwardly protruding member, the upwardly protruding members defining the second position of the fiber holding block.

13. The thermal treatment station of claim 1, farther including a chimney mounted to the chassis such that the chimney is positioned over the flame.

14. The thermal treatment station of claim 1, further including:
a translation stage mounted to the chassis for holding the torch, the translation stage including screws for adjusting the position of the torch translationally along an x-axis, a y-axis, and a z-axis.

15. The thermal treatment station of claim 1, further including a laser source mounted to the fiber holding block such that a characteristic interference pattern is created when a spliced optical fiber is loaded into the fiber holding block, the interference pattern indicating the location of the splice point.

16. The thermal treatment station of claim 1, further including a heating wire assembly mounted proximate to the torch for igniting the torch and insuring that the flame is not inadvertently extinguished.

17. A thermal treatment station, comprising:
a plate having a central cutaway section;
first and second fiber clamps on either side of the cutaway section for holding a pair of spliced optical fibers having a splice point positioned within the cutaway section, the first clamp holding optical fiber firmly in position, the second clamp allowing optical fiber to pass therethrough such that the second clamp functions as a guide;
a translation stage for moving the plate in order to controllably position the splice point within a flame from a torch;
a position reader for reading the position of the translation stage.

18. The thermal treatment system of claim 17, further including a weight guide mounted to the plate proximate to the second clamp for guiding a weighted end of the optical fiber.

19. The thermal treatment system of claim 17, further including a chimney mounted to the plate such that the chimney is positioned over the flame.

20. A method for splicing together a first and a second optical fiber, comprising:
(a) splicing the first and second fibers together at a splice point using a fusion splicer using fusion splicing parameters that cause a first dopant in the first fiber to diffuse such that a desired expansion of the first fiber modefield is achieved;
(b) positioning the splice point within a flame to cause a second dopant in the first fiber to diffusion, while maintaining the expansion of the first fiber mode-field;
(c) monitoring the spliced first and second fibers for splice loss; and
(d) removing the spliced first and second fibers from the flame when a desired minimum level of splice loss is achieved.

21. The method of claim 20, wherein the second fiber has a larger mode-field diameter than the first fiber, and wherein step (a) includes using fusion splicing parameters that have been optimized to create a desired level of mode-field diffusion in the first fiber such that at the splice point the first fiber mode-field diameter matches the second fiber mode-field diameter.

22. A method for splicing together first and second optical fibers, comprising:
(a) splicing the first and second fibers together at a splice point using a fusion splicer using fusion splicing parameters that cause a first dopant in the first fiber to diffuse such that a desired expansion of the first fiber mode-field is achieved;
(b) loading the spliced fibers into a fiber holding block in a thermal treatment station;
(c) positioning the splice point such that it lies within a flame from a torch in the thermal treatment station to cause a second dopant in the first fiber to diffuse, while maintaining the expansion of the first fiber mode-field;
(d) monitoring the spliced first and second fibers for splice loss;
(e) removing the splice point from the flame when a desired minimum level of splice loss has been achieved; and
(f) removing the spliced first and second fibers from the thermal treatment station.

* * * * *